(12) United States Patent
Pereira

(10) Patent No.: US 11,681,508 B2
(45) Date of Patent: Jun. 20, 2023

(54) SOURCE CODE ANALYSIS TO MAP ANALYSIS PERSPECTIVES TO EVENTS

(71) Applicant: Cisco Technology, Inc., San Jose, CA (US)

(72) Inventor: Pratap Pereira, Saratoga, CA (US)

(*) Notice: Subject to any disclaimer, the term of this patent is extended or adjusted under 35 U.S.C. 154(b) by 0 days.

(21) Appl. No.: 17/001,518

(22) Filed: Aug. 24, 2020

(65) Prior Publication Data
US 2022/0058004 A1 Feb. 24, 2022

(51) Int. Cl.
*G06F 9/44* (2018.01)
*G06F 9/445* (2018.01)
*G06F 9/455* (2018.01)
*G06F 8/41* (2018.01)
*G06F 11/36* (2006.01)
*G06F 8/75* (2018.01)
*G06F 8/71* (2018.01)

(52) U.S. Cl.
CPC .............. *G06F 8/41* (2013.01); *G06F 8/71* (2013.01); *G06F 8/75* (2013.01); *G06F 11/3624* (2013.01)

(58) Field of Classification Search
CPC ..... G06F 8/41; G06F 8/71; G06F 8/75; G06F 11/3624
See application file for complete search history.

(56) References Cited

U.S. PATENT DOCUMENTS

| 5,590,331 | A | * | 12/1996 | Lewis ................. G06F 8/54 717/146 |
| 5,970,490 | A | | 10/1999 | Morgenstern |
| 6,151,618 | A | | 11/2000 | Wahbe et al. |
| 6,173,441 | B1 | | 1/2001 | Klein |
| 6,397,379 | B1 | | 5/2002 | Yates, Jr. et al. |
| 6,442,663 | B1 | | 8/2002 | Sun et al. |
| 6,453,465 | B1 | | 9/2002 | Klein |
| 6,658,421 | B1 | | 12/2003 | Seshadri |
| 6,772,413 | B2 | | 8/2004 | Kuznetsov |

(Continued)

FOREIGN PATENT DOCUMENTS

| CN | 102158516 B | * | 8/2013 |
| CN | 102982075 B | | 10/2016 |

(Continued)

OTHER PUBLICATIONS

Anas Mahmoud, Source code indexing for automated tracing, 2011, pp. 1-8. https://www.researchgate.net/publication/228574463_Source_code_indexing_for_automated_tracing (Year: 2011).*

(Continued)

*Primary Examiner* — Mongbao Nguyen
(74) *Attorney, Agent, or Firm* — Lee & Hayes, P.C.

(57) ABSTRACT

Techniques to process a source code program include, by one or more processors, determining an analysis perspective is exhibited by one or more portions of the source code program based at least in part on processing the source code program and an analysis perspective definition collection. The techniques further include storing a mapping of the analysis perspective to event data that is generated by object code when executed by one or more processors of a target computing system, wherein the object code is associated with the one or more source code program portions that exhibit the analysis perspective.

20 Claims, 8 Drawing Sheets

(56) References Cited

U.S. PATENT DOCUMENTS

| | | | |
|---|---|---|---|
| 6,928,640 B2* | 8/2005 | Schlussman | G06F 8/30 717/137 |
| 6,961,930 B1 | 11/2005 | Waldspurger et al. | |
| 7,665,077 B2 | 2/2010 | Mariani et al. | |
| 7,673,340 B1* | 3/2010 | Cohen | G06F 11/3438 379/266.08 |
| 8,762,951 B1 | 6/2014 | Kosche | G06F 11/3476 717/127 |
| 8,813,055 B2* | 8/2014 | Kosche | G06F 11/3612 717/130 |
| 8,997,070 B2 | 3/2015 | Klemenz et al. | |
| 9,098,201 B2 | 8/2015 | Benjamin et al. | |
| 9,519,698 B1 | 12/2016 | Lee et al. | |
| 9,612,937 B2* | 4/2017 | Smith | G06F 9/4498 |
| 9,703,666 B2 | 7/2017 | Chessell et al. | |
| 10,055,481 B2 | 8/2018 | Ideses et al. | |
| 10,127,041 B2 | 11/2018 | Henry et al. | |
| 10,209,962 B2 | 2/2019 | Mishra et al. | |
| 10,223,141 B2 | 3/2019 | Mars et al. | |
| 10,534,692 B2 | 1/2020 | Hejlsberg et al. | |
| 10,628,438 B2 | 4/2020 | Waas et al. | |
| 10,649,744 B1* | 5/2020 | Black | G06F 8/427 |
| 2006/0059146 A1* | 3/2006 | McAllister | G06F 11/3471 |
| 2008/0127107 A1* | 5/2008 | Kosche | G06F 11/3476 717/128 |
| 2008/0127116 A1* | 5/2008 | Kosche | G06F 11/3471 717/130 |
| 2010/0199109 A1* | 8/2010 | Terek | G06F 3/0671 713/194 |
| 2011/0173594 A1* | 7/2011 | Bartolomeo | G06F 11/3604 717/141 |
| 2017/0308457 A1* | 10/2017 | Bareness | G06F 8/436 |
| 2018/0225096 A1* | 8/2018 | Mishra | G06F 8/53 |
| 2018/0232297 A1* | 8/2018 | Fan | G06F 11/3624 |
| 2019/0068994 A1* | 2/2019 | He | H04N 19/18 |
| 2019/0303270 A1* | 10/2019 | Hoermann | G06F 11/3644 |
| 2019/0317877 A1* | 10/2019 | Chen | G06F 11/364 |
| 2020/0272438 A1* | 8/2020 | Klemenz | G06F 8/35 |
| 2020/0278917 A1* | 9/2020 | Matsumoto | G06F 11/323 |
| 2021/0042141 A1* | 2/2021 | De Marco | G06F 9/45558 |
| 2021/0117309 A1* | 4/2021 | O'Dowd | G06F 11/3664 |
| 2021/0286601 A1* | 9/2021 | Fitzsimons | G06F 8/72 |
| 2022/0083319 A1 | 3/2022 | Zhang et al. | |

FOREIGN PATENT DOCUMENTS

| | | | | |
|---|---|---|---|---|
| CN | 107209680 A * | 9/2017 | | G06F 8/453 |
| EP | 3937011 A1 * | 1/2022 | | G06F 8/315 |
| WO | WO-2018015707 A1 * | 1/2018 | | G06F 11/3624 |
| WO | WO-2020089750 A1 * | 5/2020 | | G06F 8/447 |

OTHER PUBLICATIONS

Michael Szvetits, Architectural Design Decisions for Systems Supporting Model-Based Analysis of Runtime Events: A Qualitative Multi-Method Study, 2018. https://ieeexplore.ieee.org/stamp/stamp.jsp?tp=&arnumber=8417144 (Year: 2018).*

Tim Cramer, Performance Analysis for Target Devices with the OpenMP Tools Interface, 2015, pp. 215-224. https://www.itc.rwth-aachen.de/cms/IT-Center/Forschung-Projekte/High-Performance-Computing/Publikationen/~fddi/Einzelansicht/?file=540040&lidx=1 (Year: 2015).*

Oliver Jakob Arndt, Abstracting Parallel Programming and its Analysis Towards Framework Independent Development, 2015, pp. 96-103. https://ieeexplore.ieee.org/stamp/stamp.jsp?tp=&arnumber=7328192 (Year: 2015).*

Mahmoud, et al., "Source Code Indexing for Automated Tracing", ACM Digital Library, May 23, 2011, 7 pages.

Colby et al., "A Certifying Compiler for Java," ACM, 2000, 13 pages.

Maruyama et al., "A Case Tool Platform Using an XML Representation of Java Source Code," IEEE, 2004, 10 pages.

Office Action for U.S. Appl. No. 17/024,521, dated Feb. 4, 2022, Zhang, "Compiler-Generated Alternate Memory-Mapped Data Access Operations," 16 pages.

Santhanam, "The Anatomy of an FAA-Qualifiable Ada Subset Compiler," ACM, 2002, 4 pages.

Byun et al., "Toward Rigorous Object-Code Coverage Criteria", IEEE, pp. 328-338 (Year: 2017), 11 pages.

Chen et al., "An Empirical Study on the Practice of Maintaining Object-Relational Mapping Code in Java Systems", IEEE, pp. 165-176(Year:2016), 12 pages.

Davidson et al., "Code Selection through Object Code Optimization", ACM, pp. 505-526 (Year: 1984), 22 pages.

Dyer et al, "Nu: Preserving Design Modularity in Object Code", ACM, pp. 1-2 (Year: 2006), 2 pages.

Naik et al., "Compiling with Code-Size Constraints", ACM, pp. 120-129 (Year: 2002), 10 pges.

* cited by examiner

MAPPING 108 OF ANALYSIS PERSPECTIVES 304
TO EVENT DATA SET 110/306

```
dump of source code portion
0xb21520    push    %rbp
0xb21521    push    %r15
0xb21523    push    %r14
0xb21525    push    %r13
0xb21527    push    %r12
0xb21529    push    %rbx
0xb2152a    sub     $0x168, %rsp
0xb21531    mov     %esi, %r13d
0xb21534    mov     %rdi, %r12
0xb21537    incq    0x231332(%rip)
0xb2153e    lea     0x14(%rsp), %rdi
0xb21543    mov     $0x4, %esi
0xb21548    mov     $0x2, %edx
0xb2154d    callq   0x7f3ff1ae6e60 <data_tracker@plt>   ⟵ 502
0xb21552    movl    $0x0, 0x14(%rsp)
•••
```

SOURCE CODE ANALYSIS TO MAP ANALYSIS PERSPECTIVES TO EVENTS

TECHNICAL FIELD

The present disclosure relates generally to source code analysis and, more specifically to functionality perspectives exhibited by the source code to events generated by executing object code corresponding to the source code.

BACKGROUND

Debugging and analysis of software systems and networks of systems can be difficult. For example, debugging and analysis may involve a programmer instrumenting source code. The instrumentation may include, for example, tagging source code with various classifications. The classification is typically fixed and falls into a rigid a priori determination, which may be typically represented with a static set of tags.

Particularly as code grows in size and complexity, it may be harder to manage different expectations from an analysis point of view. If the tag space is allowed to be dynamic and unbounded, a determination by a developer of what tags to match to different source code portions may become unwieldy and error prone.

It may be useful to provide techniques to efficiently analyze and tag source code with various perspectives, where such techniques may correctly analyze and tag even complex code and may, for example, operate with potentially dynamically defined perspectives.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates an example machine code fragment, for execution by a target computing system, that includes a debug operation added by a compiler (and/or linker) compiling a source code portion corresponding to an analysis perspective.

DESCRIPTION OF EXAMPLE EMBODIMENTS

Overview

Figure 1:
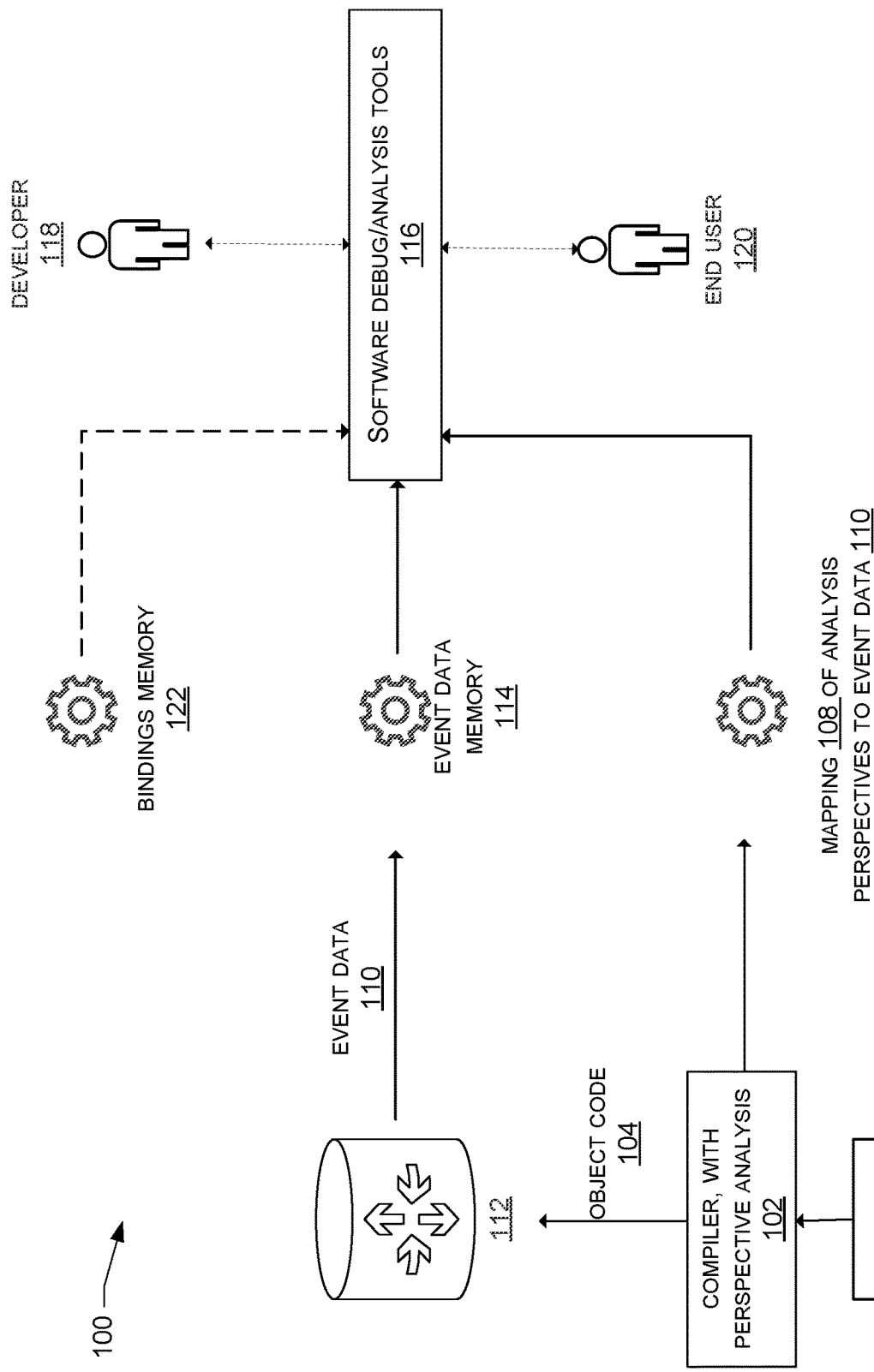
FIG. 1 is a diagram illustrating a system in which a compiler is configured to perform perspective analysis.

This disclosure describes techniques to process a source code program. The techniques include, by one or more processors, determining an analysis perspective is exhibited by one or more portions of the source code program based at least in part on processing the source code program and an analysis perspective definition collection. The techniques further include storing a mapping of the analysis perspective to event data that is generated by object code when executed by one or more processors of a target computing system, wherein the object code is associated with the one or more source code program portions that exhibit the analysis perspective.

The disclosure also describes techniques that further include causing the one or more processors of the target computing system to execute the object code. The techniques still further include processing the mapping and the event data to display an indication of source code portions exhibiting the analysis perspective, based at least in part on user input designating the analysis perspective.

The disclosure also describes techniques that yet further include determining a second analysis perspective is exhibited by at least one of the one or more source code program portions based at least in part on processing the source code program and the analysis perspective definition collection. The techniques further include storing a mapping of the second analysis perspective to the event data. The techniques further include processing the mapping and the event data to display an indication of source code portions exhibiting the second analysis perspective, based at least in part on user input designating the second analysis perspective.

Additionally, the techniques described herein may be performed by a system and/or device having non-transitory computer-readable media storing computer-executable instructions that, when executed by one or more processors, performs the methods described herein.

EXAMPLE EMBODIMENTS

It may be useful to provide techniques to efficiently analyze and tag source code with various perspectives, where such techniques may correctly analyze and tag even complex code and may, for example, operate with potentially dynamically defined analysis perspectives without recompiling the source code. Particularly as code grows in size and complexity, it may become harder for a software developer to manage different expectations from an analysis point of view. If a number of analysis perspectives for debugging is allowed to be dynamic and unbounded, a determination by a developer of what perspectives to match to different source code portions may become unwieldy and error prone.

Examples of analysis perspectives include a memory allocation analysis perspective, an inter-process communication analysis perspective, a configuration processing analysis perspective, a state machine analysis perspective and an error recovery analysis perspective. These are just examples, and many more examples are possible.

Furthermore, it may be useful to determine additional analysis perspectives after a software program is installed and executing on a customer's in-the-field target computing system. It may also be useful to be able to debug the installed and executing software program in accordance with the additional analysis perspectives without recompiling the software program and installing the recompiled software program on the customer's in-the-field target computing system.

For analysis perspectives that are known at compile-time, event data to be generated by object code corresponding to source code program portions and executed by one or more processors of a target computing system may be mapped to the known analysis perspectives at compile time. For object code corresponding to a source code program portion that does not include a source code debug instruction or the source code program portion does not otherwise generate event data to which an analysis perspective may be mapped, the compiler may generate an object code instruction that will generate such event data when executed by the one or more processors of a target computing system.

For example, the target computing system, when executing object code corresponding to the source code program, may store event data into an event data memory. The event data memory may be accessible to software debug/analysis tools that may be used, for example, by a developer of the source code or by an end user of the target computing system. For example, the developer and/or end user may configure the software debug/analysis tools to filter the event data, in the event data memory, based on a mapping of analysis perspectives to the event data.

A compiler, along with being configured to generate the object code that corresponds to the source code program, may be also configured to analyze the source code program and to determine portions of the source code program to which various analysis perspectives correspond. In addition, the compiler may be configured to generate a mapping of the analysis perspectives to the event data that is generated by the object code corresponding to those portions of the source code, when the object code is executed by one or more processors of a target computing system.

Analysis processing of a compiler may process the source code program and a perspective definitions collection to determining an analysis perspective is exhibited by one or more portions of the source code program. The perspectives definition collection may hold definitions that may be perspective abstractions the analysis processing may utilize in determining if a portion of the source code exhibits characteristics of a particular analysis perspective. The analysis perspective definitions may correspond to individual source code instructions or, in some examples, multiple source code instructions collectively characterize an analysis perspective.

The use of the perspectives definition collection may relieve a developer from remembering and applying many analysis perspectives to possibly millions of lines of a source code program. Furthermore, since such a large source code program is typically developed organically over time and by many different programmers, use of the perspectives definition collection may increase the likelihood that the analysis perspectives are applied consistently across the source code program. As mentioned, for object code corresponding to a source code program portion that does not include a source code debug instruction or the source code program portion does not otherwise generate event data to which an analysis perspective may be mapped, the compiler may generate an object code instruction that will generate such event data when executed by the one or more processors of a target computing system.

Furthermore, additional analysis perspectives may be defined after a software program has been installed in-the-field on a customer's target computing system. In that situation, the perspectives definition collection may be updated with definitions of the additional analysis perspectives. The mapping of the analysis perspectives to the event data may be updated by processing the source code program that corresponds to the object code installed in-the-field on a customer's target computing system. The updating of the mapping may be performed, if desired, without recompiling the source code program and without re-installing the software program on the customer's target computing system. A developer and/or end user may analyze event data, generated by executing previously generated object code by the target computing system, using the updated mapping of analysis perspectives to the event data. In other words, new perspectives and new ways of classifying traces may be generated based on those perspectives, even after the object code has been shipped and deployed in the field.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating a system 100 in which a compiler 102 is configured to perform perspective analysis. That is, the compiler 102, along with being configured to generate object code 104 that corresponds to source code 106, the compiler 102 is also configured to analyze the source code 106 and to determine portions of the source code 106 to which analysis perspectives correspond. In addition, the compiler 102 is configured to generate a mapping 108 of the analysis perspectives to event data 110 that is generated by the object code 104 corresponding to those portions of the source code 106, when the object code is executed by one or more processors of a target computing system 112.

The target computing system 112 may be, for example, a device such as a network router, switch or access point that is operating in a network deployed by an end customer of the supplier of the target computing system 112. The target computing system 112, however, is not limited to being a device operating in a network. The target computing system 112 may be any computing device or system having at least one processor that may be configured to execute object/machine code.

The event data 110 may, for example, be stored by the target computing system 112 into an event data memory 114 while the target computing system 112 is executing object code 104 generated by the compiler 102. The event data memory 114 may be accessible to software debug/analysis tools 116 that may be used, for example, by a developer 118 of the source code or by an end user 120 of the target computing system 110. For example, the developer 118 and/or end user 120 may configure the software debug/ analysis tools 116 to filter the event data 110, in the event data memory 114, based on the mapping 108 of the analysis perspectives to the event data 110 as generated by the compiler 102.

The compiler 102 determines at least some of the analysis perspectives exhibited by portions of the source code 106 exclusive of lines of source code 106 resulting in object code 104 that, when executed by the target computing system 112, cause the target computing system 112 to generate event data 110. Thus, for example, even though the a line of source code 106 resulting in particular event data 110 in the event data memory 114 and/or the particular event data 110 itself may not include information to determine to what analysis perspective a particular piece of event data 110 corresponds, the mapping 108 of analysis perspectives to the event data 110 may provide that "missing" information for use by the software debug/analysis tools 114.

At least some of the event data 110 in the event data memory 114 may be unconditionally bound to a unique identifier of the operation that generates the piece of the event data 110. For example, a debug operation may be an operation by the target computing system 112 to increment a counter in a memory each time the target computing system 112 executes object code corresponding to a particular operation or type of operation, as observed in the source code. As another example, the debug operation may be an operation by the target computing system 112 to store in memory and/or to output an indication each time the target computing system 112 executes object code corresponding to a particular operation or type of operation, as observed in the source code.

As just discussed, the event data 110 in the event memory 114, resulting from the debug operation, may be unconditionally bound to a unique identifier. For example, the event data 110 in the event memory 114, resulting from the debug operation, may be unconditionally stored into a unique memory location. For example, the compiler 102 may encode the unique memory location directly into the object code that corresponds to the debug operation. As another example, the object code corresponding to the debug operation may result in the target computing system 112 outputting an indication each time the target computing system 112 executes object code corresponding to a particular operation or type of operation, as observed in the source code. The indication may be unconditionally bound to a unique identifier. For example, a compiler may encode the unique identifier directly into object code that corresponds to the debug operation.

Because the result of the debug operation is unconditionally bound to a unique identifier of the operation, and the object code corresponding to the debug operation does not include conditional operations, the debug operation is extremely lightweight. That is, the debug operation minimally affects the operation of the target computing system 112 such that, for example, the debug operation may be nominally "always on" such that the debug operation is executed as a matter of course, even in systems such as networks deployed at an end customer.

The system 100 may also include a bindings memory 122. The compiler 102 may populates the bindings memory 122 with metadata from which a process, such as a portion of the software debug/analysis tools 116, may associate the unique identifier with the portion of the source code to which the debug operation corresponds.

Referring again to the bindings memory 122, if the unique identifier is a memory location, the compiler (and/or linker) may populate the bindings memory 122 with metadata that correlates the memory location with a textual indication of a source code portion and/or other indicator of the operation, as observed in the source code, to which the piece of event data 110 produced by debug operation corresponds. As a result, the software debug/analysis tools 116 can correlate the contents of the memory location, such as a counter that is incremented by the debug operation each time the target computing system 112 executes object code corresponding to an operation as observed in the source code, to the portion of the source code that corresponds to the debug operation.

As another example, the unique identifier may be a globally unique identifier that the target computing system 112 outputs each time the target computing system 112 outputs the result 104 of the debug operation. In this example, the compiler (and/or linker) may populate the bindings memory 122 with metadata that correlates the globally unique identifier with a textual indication of a source code portion and/or other indicator of the operation, as observed in the source code, to which an item of event data 110 produced by debug operation corresponds. As a result, the software debug/analysis tools 116 can correlate the contents of the memory location, such as the globally unique identifier that is output as a result of the debug operation each time the target computing system 112 executes object code corresponding to an operation as observed in the source code, to the portion of the source code that corresponds to the debug operation.

Figure 2:
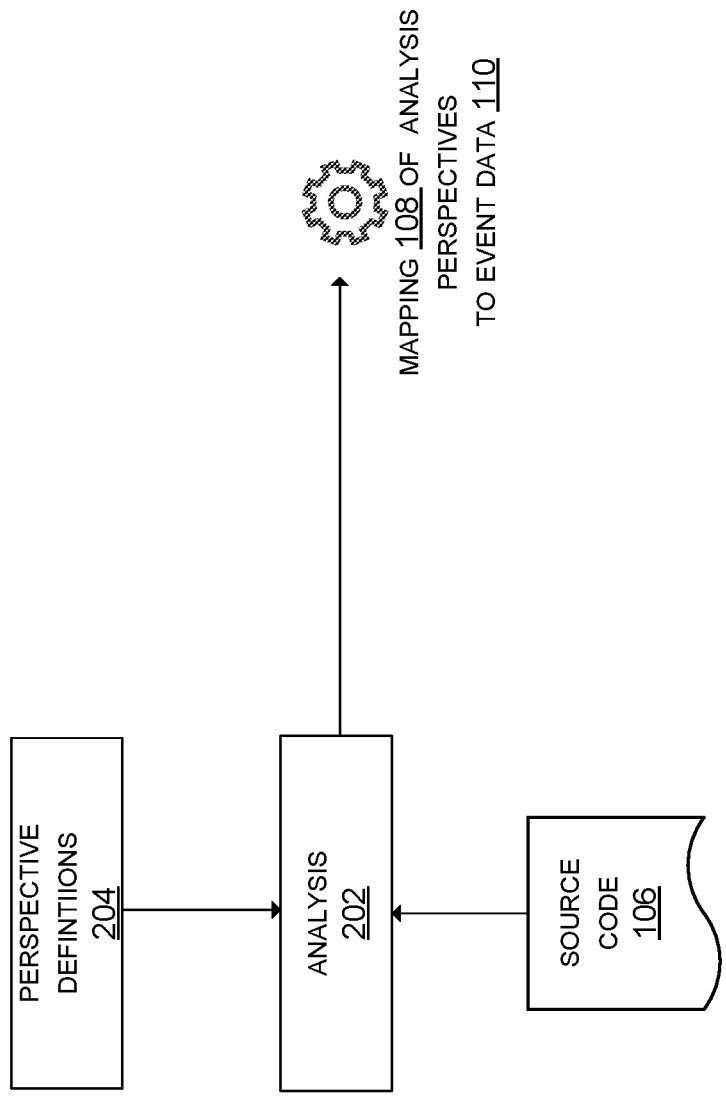
FIG. 2 provides greater detail about how the mapping of analysis perspectives to event data may be generated.

FIG. 2 provides greater detail about how the mapping 108 of analysis perspectives to event data 110 may be generated. Analysis processing 202 processes the source code 106 and a perspective definitions collection 204 to determining an analysis perspective is exhibited by one or more portions of the source code program. The perspectives definition collection holds definitions that may be perspective abstractions the analysis processing 202 may utilize in determining if a portion of the source code 106 exhibits characteristics of a particular analysis perspective.

For example, a perspective abstraction for a portion of the source code 106 may be characterized by source code instructions related to memory allocation. Such source code instructions related to memory allocation may include, for example, the following:

identifier_t *t = malloc(sizeof(identifier_t));
...
trace_event("identifier handle %p\n", t); Here, the fact that the variable t being traced is coming from an allocation via malloc gives this trace/event line the 'memory perspective'.
...
free(t);

The perspective definitions collection 204 may include a definition of the memory allocation perspective as a listing of source code instructions that exhibit memory allocation characteristics. When the analysis processing 202 finds one of the memory allocation related source code instructions, as included in the perspective definitions collection 204, in a portion of the source code 106, the analysis processing 202 provides a mapping 108 of the memory allocation perspective to event data 110 that results from debug operations within that portion of the source code.

As another example, the perspective definitions collection 204 may include a definition of the inter-process communication perspective as a listing of source code instructions that exhibit inter-process communication characteristics.

Such source code instructions related to inter-process communication may include, for example, the following:

```
identifier_t *t = malloc(sizeof(identifier_t));
...
msg_t *msg = create_msg( );
object_serialize(msg, t);
send_msg(message_channel, msg);
destroy_msg(msg);
trace_event("identifier handle %p\n", t); Here, the fact that the variable t
    being traced is coming from an allocation via malloc gives this
    trace/event line the 'memory perspective'. Also, here, the fact that the
    variable msg is derived from t and is used in the
    'send_msg(message_channel,*)' call, now makes this also have the
    'ipc perspective'
...
free(t);
```

When the analysis block 202 finds one of the inter-process communication related source code instructions, as included in the perspective definitions collection 204, in a portion of the source code 106, the analysis block 202 provides a mapping 108 of the inter-process communication perspective to event data 110 that results from debug operations within that portion of the source code.

As another example, the perspective definitions collection 204 may include a definition of the inter-process communication perspective as a listing of source code instructions that exhibit configuration processing characteristics. Such source code instructions related to configuration processing may include, for example, the following:

```
identifier_t *t = malloc(sizeof(identifier_t));
...
msg_t *msg = create_msg( );
object_serialize(msg, t);
send_msg(message_channel, msg);
destroy_msg(msg);
trace_event("identifier handle %p\n", t); Here, the fact that the variable t
    being traced is coming from an allocation via malloc gives this
    trace/event line the 'memory perspective'. Here, the fact that the
    variable msg is derived from t and is used in the
    'send_msg(message_channel,*)' call, now makes this also have the
    'ipc perspective'
...
free(t);
```

When the analysis block 202 finds one of the configuration processing related source code instructions, as included in the perspective definitions collection 204, in a portion of the source code 106, the analysis block 202 provides a mapping 108 of the configuration processing perspective to event data 110 that results from debug operations within that portion of the source code.

In yet other examples, analysis perspectives in the perspectives definition collection 204 are defined at a higher level than a single source instruction or a list of single source instructions. Rather, some analysis perspectives in the perspectives definition collection 204 may be defined by combinations of source code instructions that collectively exhibit a particular characteristic corresponding to an analysis perspective. For example, a portion of the source code 106 may include a combination of source code instructions that collectively exhibit a state machine characteristic. For example, a block of code may represent a state-machine perspective if:
   a. Code has enumerations with multiple values that represent states.
   b. Code has high conditional branches that check and set variable values that have these enumerations to implement state transitions.
   i. Deeply nested switch case (either local within function scope or indirectly via called functions).
   ii. Enumerations used to index a state transition matrix.
The state structures and the trace/events related to the state structures may be tagged as 'state machine like'. Some class of source analysis may result in false positives since the purpose is auto-classification. False positives may be preferred to false negatives. The type of analysis can be exact or a heuristic that still serves the purpose of making the resultant trace/event set filtered to a manageable size.

As another example, a portion of the source code 106 may include a combination of source code instructions that collectively exhibit an error recovery characteristic. Such a combination of source code instructions that collectively exhibit a particular characteristic corresponding to an error recovery perspective may include, for example, trace events that are likely related via common variable to NOTICE/ INFO trace/event functions as opposed to ERROR level trace/event function calls. The related traces at different levels may be all associated with an "error recovery perspective."

Figure 3:
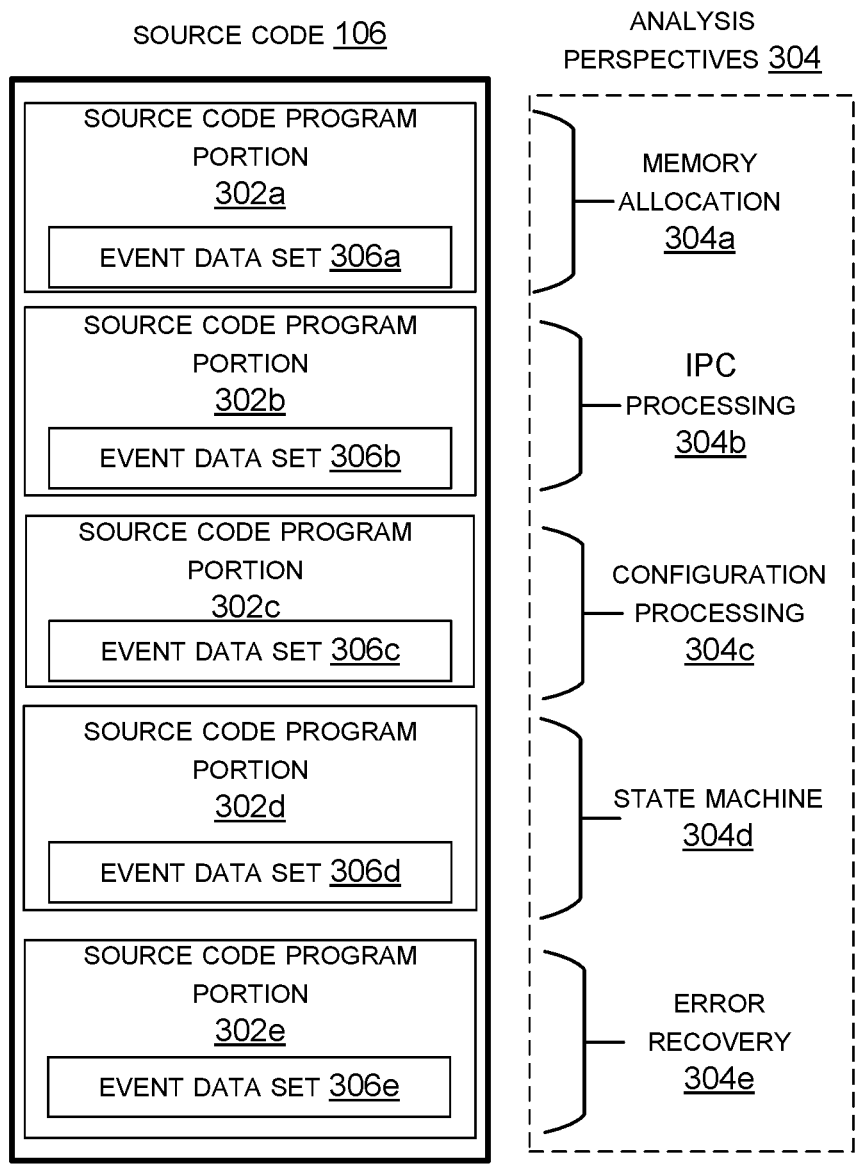
FIG. 3 illustrates an example of how portions of source code have been characterized by various analysis perspectives.

FIG. 3 illustrates an example of how source code portions 302a, 302b, 302c, 302d and 302e (collectively, 302) of the source code 106 have been characterized by perspectives 304a, 304b, 304c, 304d and 304e (collectively, 304), respectively. While FIG. 3 illustrates that the source code portions 302a, 302b, 302c, 302d and 302e that are characterized by the perspectives 304a, 304b, 304c, 304d and 304e, respectively, are non-overlapping, this is only an example. In other examples, one of the source code portions 302 may be intersect with another of the source code portions 302, or may even be a subset or a superset of another of the source code portions.

In FIG. 3, the source code portion 302a has been characterized as exhibiting a memory allocation perspective 304a. The source code portion 302b has been characterized as exhibiting an inter-process communication perspective 304b. The source code portion 302c has been characterized as exhibiting a configuration processing perspective 304c. The source code portion 302d has been characterized as exhibiting a state machine perspective 304d. Finally, the source code portion 302e has been characterized as exhibiting an error recovery perspective 304e.

Referring still to FIG. 3, in general, when the compiler 102 compiles each source code portion 302, the resulting object code, when executed by one or more processors of the target computing system 112, generates event data set 306. In particular, when the compiler 102 compiles the source code portion 302a, the resulting object code, when executed by one or more processors of the target computing system 112, generates event data set 306a. For example, the event data set 306a may be updated each time the resulting object code is executed by the one or more processors of the target computing system 112. When the compiler 102 compiles the source code portion 302b, the resulting object code, when executed by one or more processors of the target computing system 112, generates event data set 306b. When the compiler 102 compiles the source code portion 302c, the resulting object code, when executed by one or more processors of the target computing system 112, generates event data set 306c. When the compiler 102 compiles the source code portion 302d, the resulting object code, when executed by one or more processors of the target computing system 112, generates event data set 306d. When the compiler 102 compiles the source code portion 302e, the resulting object code, when executed by one or more processors of the target computing system 112, generates event data set 306e. The event data set 306a, the event data set 306b, the event data set 306c, the event data set 306d, and the event data set 306e are part of the event data 110 that is stored in the event data memory 114.

Referring back to FIG. 2 and applying the FIG. 3 example source code 106, the mapping 108 of analysis perspectives to event data 110 includes the following mappings:

memory allocation perspective 304a to event data set 306a;

inter-process communication processing perspective 304b to event data set 306b;

configuration processing perspective 304c to event data set 306c;

state machine perspective 304d to event data set 306d; and error recovery perspective 304e to event data set 306e.

In practice, there may be more than one source code portion 302 characterized by each analysis perspective 304. As a result, each analysis perspective 306 may have more than one, and even many, different event data sets 306 mapped to it.

Figure 4:
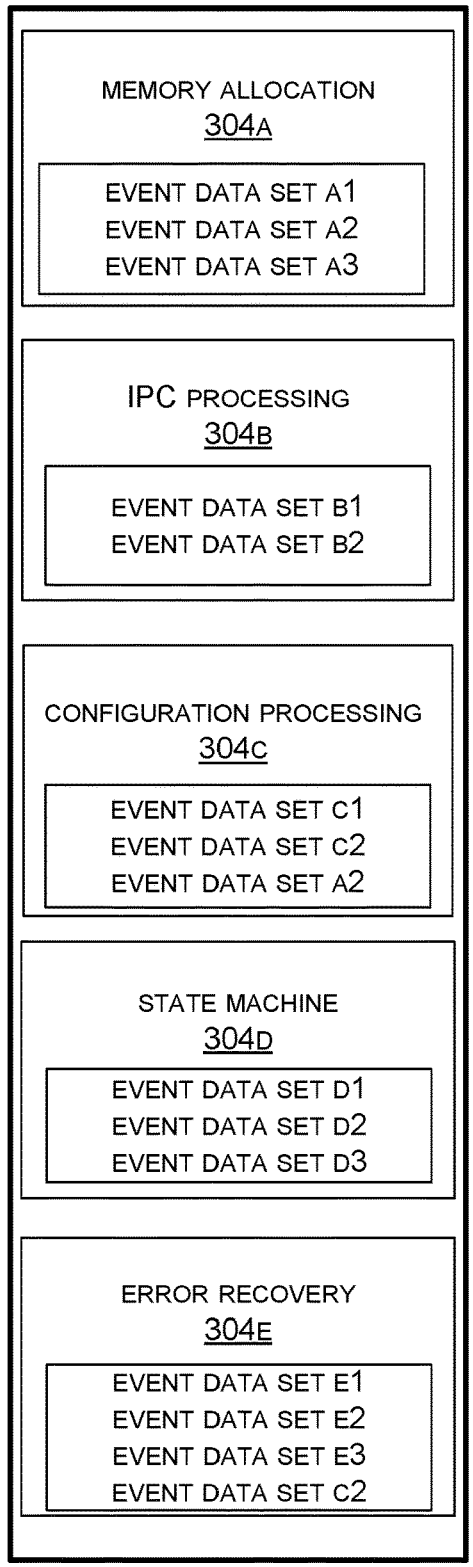
FIG. 4 illustrates an example mapping of analysis perspectives to event data for a situation in which at least some analysis perspectives characterize multiple source code portions.

FIG. 4 illustrates an example mapping 108 of analysis perspectives to event data 110 for a situation in which at least some analysis perspectives 304 characterize multiple source code portions 302. As a result, at least some of the analysis perspectives 304 have multiple event data sets mapped to them. For example, as shown in FIG. 4, the memory allocation perspective 304a has three event data sets mapped to it—event data set a1, event data set a2 and event data set a3. Each of the event data set a1, event data set a2 and event data set a3 are data sets generated by object code corresponding to a different portion of the source code 106. For example, event data set a1 is a data set that may be generated by object code corresponding to a first portion of the source code 106, and event data set a2 is a data set that may be generated by object code corresponding to a second portion of the source code 106.

Still referring to FIG. 4, as another example, the configuration processing perspective 304c has three event data sets mapped to it—event data set c1 and event data set c2. Each of the event data set c1 and event data set c2 are data sets generated by object code corresponding to a different portion of the source code 106. For example, event data set c1 is a data set that may be generated by object code corresponding to a first portion of the source code 106, and event data set c2 is a data set that may be generated by object code corresponding to a second portion of the source code 106.

Furthermore, the event data set a2, mapped to the memory allocation perspective 304a, is also mapped to the configuration processing perspective 304c and may be generated by yet another portion of the source code 106. Thus, for example, there may be overlap between a portion of the source code 106 for which corresponding object code generates an event data set mapped to one of the processing perspectives 306 and a portion of the source code 106 for which corresponding object code generates an event data set mapped to another of the processing perspectives 306. As another example, the event data set c2 is mapped to both the configuration processing perspective 304c and to the error recovery perspective 304e. As a result, there is overlap between a portion of the source code 106 for which corresponding object code generates an event data set mapped to the configuration processing perspective 304c and a portion of the source code 106 for which corresponding object code generates an event data set mapped to the error recovery processing perspective 304e. In practice, particularly for a large source code 106, which may have many millions of source code instructions, there may be many processing perspectives 304 and many instances of such source code portion overlap.

FIG. 5 illustrates an example machine code fragment 500, for execution by the target computing system 112, that includes a debug operation 502 added by a compiler (and/or linker) compiling a source code portion corresponding to an analysis perspective. The debug operation 502 is an increment instruction that, when executed by the target computing system 112, increments a value to indicate the object code corresponding to the source code portion has been executed. The debug operation 502 does not correspond to a debug operation coded by a developer into the source code portion.

The compiler (and/or linker) controls how the debug instructions are added to machine language that corresponds to an analysis perspective the compiler determines is present in the developer-written source code, such as the source code 106. Thus, the compiler (and/or linker) knows what information to include in the mapping 108 of analysis perspectives to event data 110, so that the software/debug analysis tools 116 may understand how an analysis perspective 304 maps to a result of a debug operation. This is so even for a debug operation that has been added by the compiler 102 as a result of identifying a portion of the source code 106 exhibiting the characteristics of that analysis perspective 304. Furthermore, the compiler 102 may determine that the same source code portion exhibits characteristics of a different analysis perspective, and the compiler may include a mapping of that different analysis perspective 304 in the mapping 108 of analysis perspectives to event data 110.

For example, referring to back to FIG. 3, the compiler 102 may determine that source code program portion 302a exhibits characteristics of the memory allocation perspective 304a. The compiler 102 may add a debug instruction, like the debug instruction 502, to the object code corresponding to the source code portion 304a. The compiler 102 may also include in the mapping 108 of analysis perspectives to event data 110 a mapping of the memory allocation perspective 304a to the events generated by the added debug instruction. Furthermore, the compiler 102 may also determine that the source code portion 302a also exhibits characteristics of the configuration processing perspective 304c. The compiler 102 may also include in the mapping 108 of analysis perspectives to event data 110 a mapping of the configuration processing perspective 304c to the events generated by the added debug instruction. The added debug instruction therefore generates events for the source code portion 302a relevant both to the memory allocation perspective 304a and to the configuration processing perspective 304c.

As described above, the compiler 102 may determine a portion of source code being compiled exhibits certain analysis perspectives, and the compiler 102 may map the analysis perspectives to events that are generated by one or more processors executing object code corresponding to the source code portion. In some examples, developers may continue to define different and useful analysis perspectives even after a code base has been installed in a customer system. For example, while debugging a similar system, a developer may realize that it would be useful to inspect the operation of the code with a particular analysis perspective. Customers themselves may realize that it would be useful to inspect the operation of the code with a particular analysis perspective. As a practical matter, a customer may be reticent to allow recompilation and reinstallation of the code in order to map newly defined analysis perspectives to the existing and installed source code portions.

Figure 6:
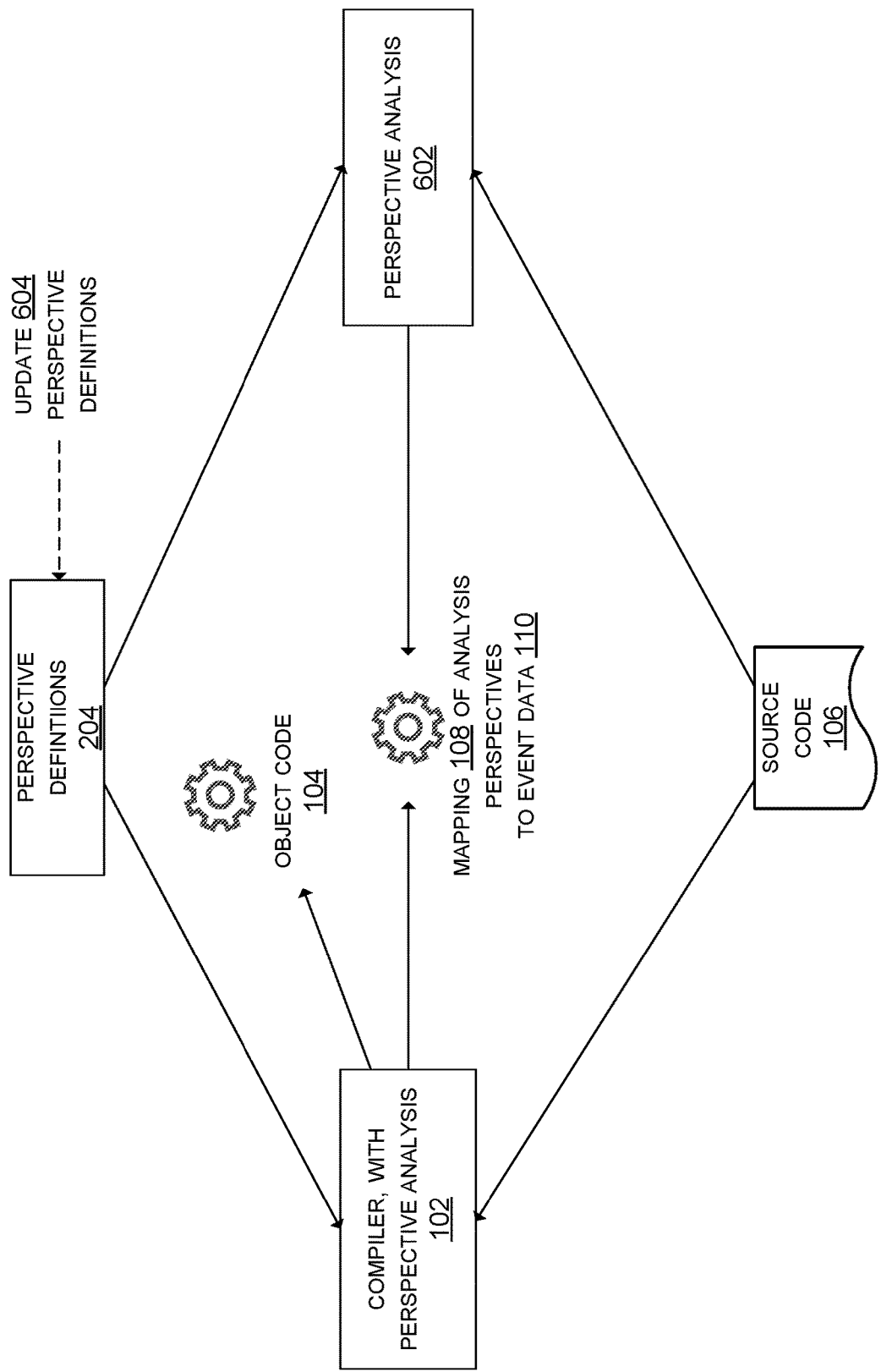
FIG. 6 is a diagram illustrating that analysis functionality similar to that included in a compiler may process source code to determine and map additional analysis perspectives, even without recompiling the source code into object code.

As discussed above, however, object code corresponding to the source code portions may already include debug instructions that generate events. As shown in FIG. 6, analysis functionality similar to that included with the compiler 102 may process the source code 106 to determine and map the additional analysis perspectives, even without recompiling the source code 106 into object code. In this way, new perspectives and new ways of classifying traces may be generated based on those perspectives, even after the object code has been shipped and deployed in the field. In some example, recompilation and reinstallation may be performed.

For example, FIG. 6 illustrates a portion of the system 100 in which a compiler 102 is configured to perform perspective analysis. That is, the compiler 102, along with being configured to generate object code 104 that corresponds to source code 106, is also configured to analyze the source code 106 and to determine portions of the source code 106 to which analysis perspectives correspond. In addition, the compiler 102 is configured to generate a mapping 108 of the analysis perspectives to event data 110 that is generated by the object code 104 corresponding to those portions of the source code 106, when the object code is executed by one or more processors of a target computing system.

As discussed above with reference to FIG. 2, the perspective analysis functionality of the compiler 102 may process the source code 106 according to perspective definitions 204 to generate the mapping 108 of analysis perspectives to event data 110. The perspective definitions 204 include perspective abstractions that the analysis block 202 maps onto portions of the source code 106.

As shown in FIG. 6, perspective analysis 602 may be carried out on the source code 106 and may not be in conjunction with operation of the compiler 102. For example, the source code 106 on which the perspective analysis 602 is carried out may be source code for which corresponding object code is already installed in a customer system. The perspective analysis 602 processes the source code 106 according to the perspective definitions 204, which may be perspectives newly-defined after the corresponding object code has been installed in a customer system, and updates the mapping 108 of analysis perspectives to event data 110. The perspective analysis 602 does not recompile the source code 106 and so there may not be an opportunity to add debug operations to object code corresponding to the source code. For example, the perspective analysis 602 may update the mapping 108 of analysis perspectives to event data 110 by mapping to event data 110 being generated by already-existing debug operations in the already-installed object code.

As also shown in FIG. 6, the perspective definitions 204 may be updated by an update operation 604. The perspective analysis 602 may be carried out on the source code 106 at any time, with the perspective definitions 204 as updated by the update, even if corresponding object code is already installed in a customer system. The customer may be able to gain advantage of the updated perspective definitions 204 even without changing the already-installed code base.

Figure 7:
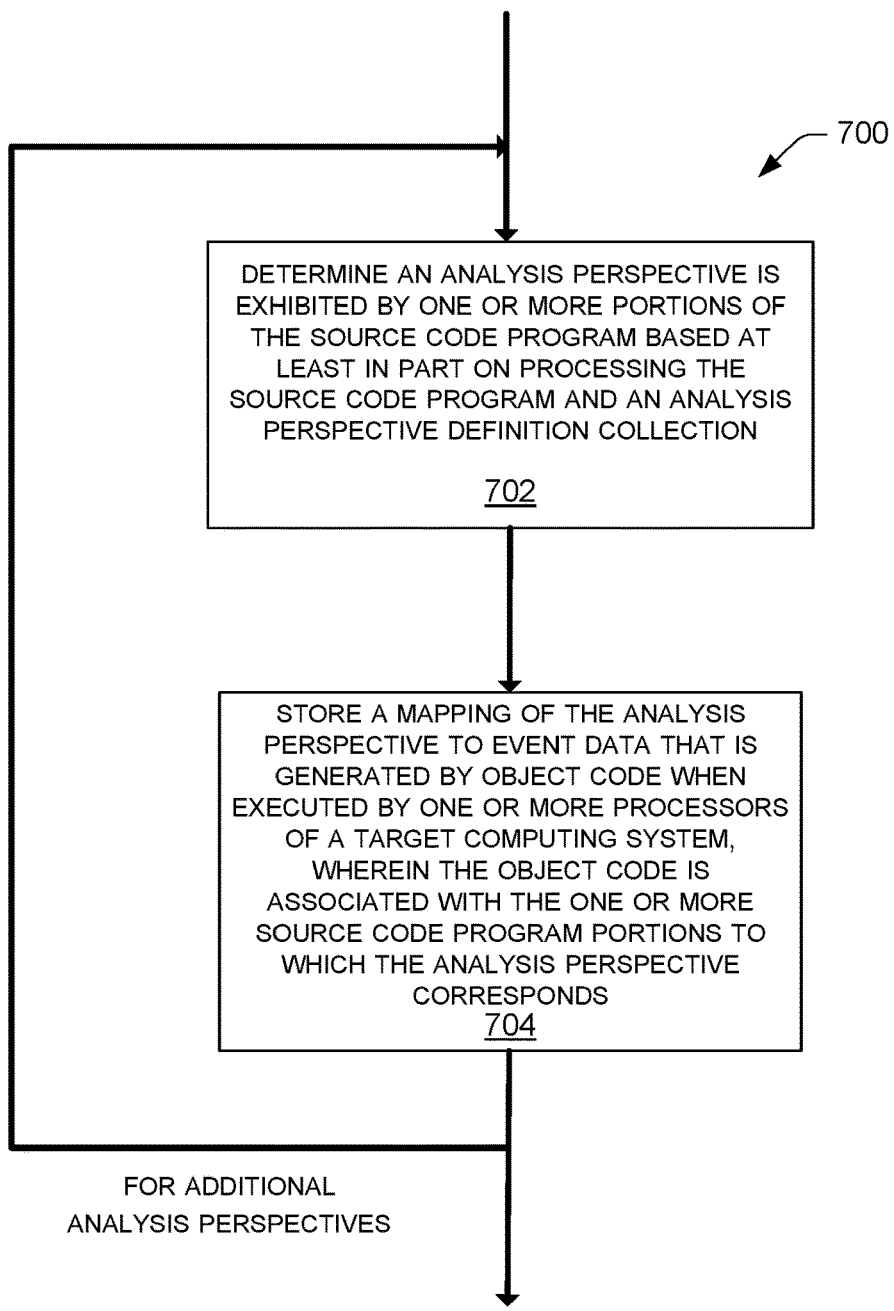
FIG. 7 is a flowchart illustrating a process that may determine analysis perspectives exhibited by a source code program and generate a mapping of the analysis perspectives to event data that is generated by one or more processors executing object code corresponding to the source code program.

FIG. 7 is a flowchart illustrating a process that may determine analysis perspectives exhibited by a source code program and generate a mapping of the analysis perspectives to event data that is generated by one or more processors executing object code corresponding to the source code program. At 702, one more processors determine an analysis perspective is exhibited by one or more portions of the source code program. The determining is based at least in part on processing the source code program and an analysis perspective definition collection. The analysis perspective definition collection includes, for example, definitions that may be perspective abstractions exhibited by individual source code instructions or collectively by a combination of source code instructions. For example, the processing at 702 may include stepping through the source code and identifying one or more portions that match an analysis perspective definition in the analysis perspectives collection.

At 704, the one or more processors store a mapping of the analysis perspective to event data that is generated by object code when executed by one or more processors of a target computing system, wherein the object code is associated with the one or more source code program portions to which the analysis perspective corresponds. Thus, for example, the mapping may be available to software debug/analysis tools for use by a developer and/or end user to debug and/or analyze how object code corresponding to the source code program is executing or has executed.

Referring still to FIG. 7, operations 702 and 704 may be repeated for additional analysis perspectives. Further, the one or more processors may perform the determining and mapping at compile time, in some examples, including optionally adding debug operations based at least in part on a determination that a source code portions exhibits an analysis perspective. Further, for example, the developer and/or end user may utilize the mapping to filter event data based on one or more particular analysis perspectives of interest, such as one or more analysis perspectives the developer and/or end user suspects is causing a problem with the execution of the object code. This filtering based on one or more particular analysis perspectives of interest may be in addition to filtering based on other information, including other information that may be available in the event data.

Figure 8:
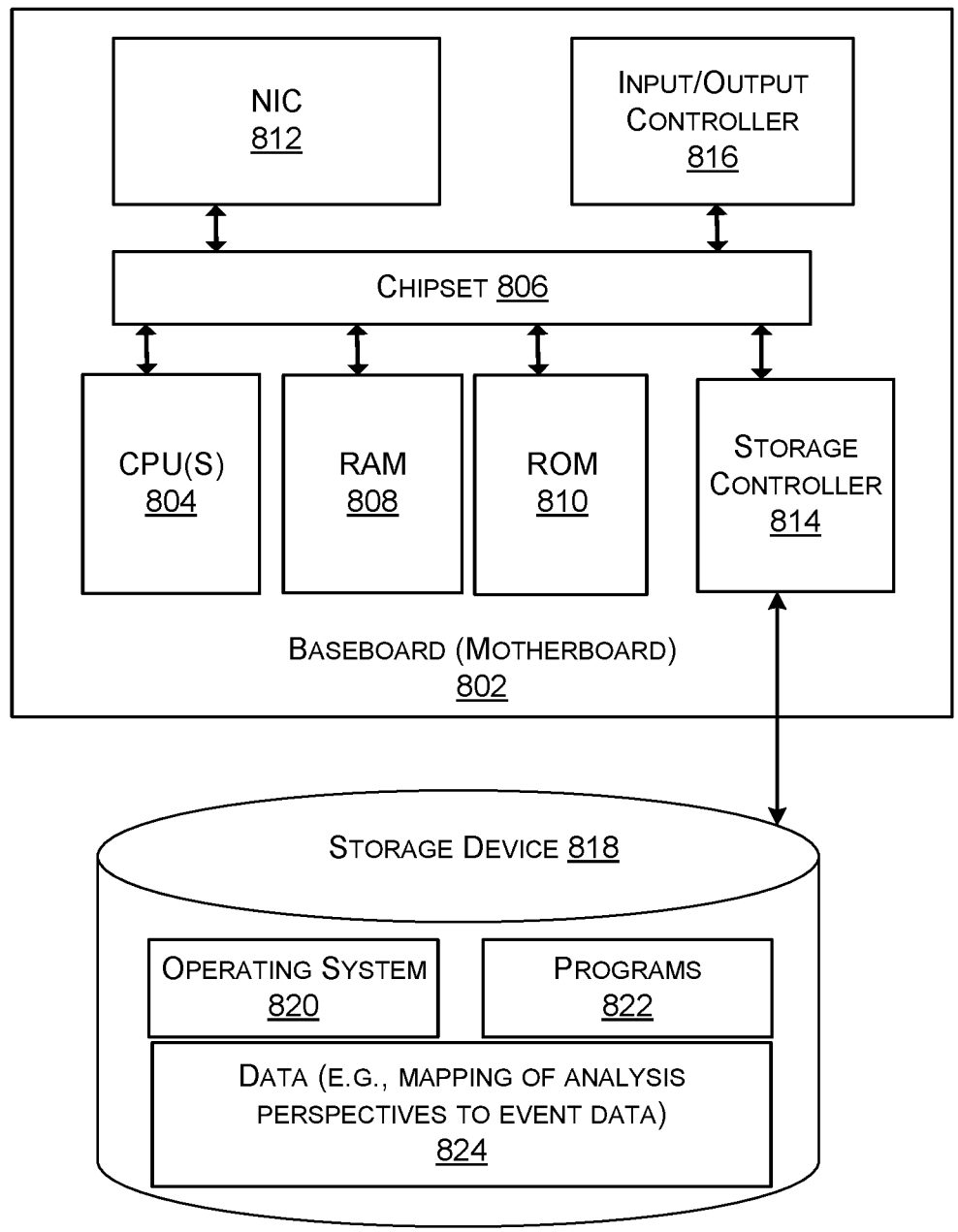
FIG. 8 illustrates an example computer architecture for a computer capable of executing program components for implementing the functionality described herein.

FIG. 8 illustrates an example computer architecture for a computer 800 capable of executing program components for implementing the functionality described above. The computer architecture shown in FIG. 8 illustrates an architecture of a server computer, workstation, desktop computer, laptop, tablet, network appliance, e-reader, smartphone, network switch, or other computing device, and can be utilized to execute any of the software components presented herein. The computer 800 may, in some examples, correspond to a network infrastructure device discussed herein.

The computer 800 includes a baseboard 802, or "motherboard," which may be a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be, for example, standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein. As illustrated in FIG. 8, the ROM 810 or NVRAM can also store data usable by the computer 800 to generate and/or process attestation information in messages exchanged among the computer 800 and other devices. In other examples, this data may be stored elsewhere, such as in RAM 808.

The computer 800 can operate in a networked environment using logical connections to remote computing devices and computer systems through a network. For example, the chipset 806 can include functionality for providing network connectivity through a Network Interface Controller (NIC) 812, such as a gigabit Ethernet adapter. The NIC 812 can connect the computer 800 to other computing devices over a network. It should be appreciated that multiple NICs 812 can be present in the computer 800, connecting the computer to other types of networks and remote computer systems. In some instances, the NICs 812 may include at least one ingress port and/or at least one egress port. An input/output controller 816 may be provided for other types of input/output.

The computer 800 can be connected to a storage device 818 that provides non-volatile storage for the computer. The storage device 818 can store an operating system 820, programs 822, and data 824, for example. The data 824 may, for example, include a mapping of analysis perspectives to event data. The storage device 818 can be connected to the computer 800 through a storage controller 814 connected to the chipset 806. The storage device 818 can include one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like. For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the storage device 818 described above, the computer 800 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 800.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of processing a source code program, the method comprising, by one or more processors:
   determining, before recompiling of source code of the source code program, an analysis perspective is exhibited by one or more portions of the source code program installed and executed by the one or more processors based at least in part on processing the source code program and an analysis perspective definition collection, the analysis perspective being defined by at least one source code instruction that exhibits a characteristic corresponding to the analysis perspective, and the analysis perspective definition collection comprising at least one perspective abstract definition of the analysis perspective;
   storing a mapping of the analysis perspective to event data that is generated by object code when executed by one or more processors of a target computing system, wherein the object code is associated with the one or more portions of the source code program that exhibit the analysis perspective, and wherein the target computing system stores the event data in an event data memory associated with a unique identifier; and
   accessing the event data memory, based at least in part on an analysis tool, to filter the event data.

2. The method of claim 1, wherein:
   the analysis perspective is a first analysis perspective; and
   the method further comprises:
      determining a second analysis perspective is exhibited by at least one of the one or more portions of the source code program based at least in part on processing the source code program and the analysis perspective definition collection; and storing a mapping of the second analysis perspective to the event data that is generated by the object code when executed by the one or more processors of the target computing system.

3. The method of claim 1, wherein:
the event data generated by object code associated with each of the one or more portions of the source code is characterized by an identifier uniquely associated with that source code portion; and
the mapping includes a listing of identifiers characterizing the event data to which the analysis perspective is mapped.

4. The method of claim 1, further comprising:
updating the analysis perspective definition collection to result in an updated analysis perspective definition collection.

5. The method of claim 4, further comprising:
repeating, before recompiling the source code program, the determining using the updated analysis perspective definition collection.

6. The method of claim 1, wherein:
the analysis perspective is one of a memory allocation analysis perspective, an inter-process communication analysis perspective, a configuration processing analysis perspective, a state machine analysis perspective or an error recovery analysis perspective.

7. The method of claim 1, further comprising:
generating the object code associated with each of the one or more portions of the source code program including, for each of the one or more portions of the source code program, generating a debug operation to generate the event data, wherein the event data is characterized by an identifier uniquely associated with that source code portion.

8. The method of claim 7, wherein at least one of the one or more portions of the source code program does not include a source code debug instruction to which the debug operation in the object code corresponds.

9. The method of claim 1, further comprising:
causing the one or more processors of the target computing system to execute the object code; and
processing the mapping and the event data to display an indication of source code portions exhibiting the analysis perspective, based at least in part on user input designating the analysis perspective.

10. The method of claim 9, wherein:
the analysis perspective is a first analysis perspective; and
the method further comprises:
determining a second analysis perspective is exhibited by at least one of the one or more portions of the source code program based at least in part on processing the source code program and the analysis perspective definition collection;
storing a mapping of the second analysis perspective to the event data; and
processing the mapping and the event data to display an indication of source code portions exhibiting the second analysis perspective, based at least in part on user input designating the second analysis perspective.

11. One or more non-transitory computer-readable storage media storing computer-readable instructions that, when executed, instruct one or more processors to perform operations for processing a source code program, comprising:
determining, before recompiling of source code of the source code program, an analysis perspective is exhibited by one or more portions of the source code program installed and executed by the one or more processors based at least in part on processing the source code program and an analysis perspective definition collection, the analysis perspective being defined by at least one source code instruction that exhibits a characteristic corresponding to the analysis perspective, and the analysis perspective definition collection comprising at least one perspective abstract definition of the analysis perspective;
storing a mapping of the analysis perspective to event data that is generated by object code when executed by one or more processors of a target computing system, wherein the object code is associated with the one or more portions of the source code program that exhibit the analysis perspective, and wherein the target computing system stores event data in an event data memory associated with a unique identifier; and
accessing the event data memory, based at least in part on an analysis tool, to filter the event data.

12. The one or more non-transitory computer-readable storage media of claim 11, wherein:
the analysis perspective is a first analysis perspective; and
the operations further comprise:
determining a second analysis perspective is exhibited by at least one of one or more portions of the source code program based at least in part on processing the source code program and the analysis perspective definition collection; and
storing a mapping of the second analysis perspective to the event data that is generated by the object code when executed by the one or more processors of the target computing system.

13. The one or more non-transitory computer-readable storage media of claim 11, wherein:
the event data generated by object code associated with each of the one or more portions of the source code is characterized by an identifier uniquely associated with that source code portion; and
the mapping includes a listing of identifiers characterizing the event data to which the analysis perspective is mapped.

14. The one or more non-transitory computer-readable storage media of claim 11, the operations further comprising:
updating the analysis perspective definition collection to result in an updated analysis perspective definition collection.

15. The one or more non-transitory computer-readable storage media of claim 14, the operations further comprising:
repeating, before recompiling the source code program, the determining using the updated analysis perspective definition collection.

16. The one or more non-transitory computer-readable storage media of claim 11, wherein:
the analysis perspective is one of a memory allocation analysis perspective, an inter-process communication analysis perspective, a configuration processing analysis perspective, a state machine analysis perspective or an error recovery analysis perspective.

17. The one or more non-transitory computer-readable storage media of claim 11, the operations further comprising:
generating the object code associated with each of the one or more portions of the source code program including, for each of the one or more portions of source code program, generating a debug operation to generate the event data, wherein the event data is characterized by an identifier uniquely associated with that source code portion.

18. The one or more non-transitory computer-readable storage media of claim 17, wherein at least one of the one or more portions of the source code program does not include a source code debug instruction to which the debug operation in the object code corresponds.

19. The one or more non-transitory computer-readable storage media of claim 11, the operations further comprising:
  causing the one or more processors of the target computing system to execute the object code; and
  processing the mapping and the event data to display an indication of source code portions exhibiting the analysis perspective, based at least in part on user input designating the analysis perspective.

20. The one or more non-transitory computer-readable storage media of claim 19, wherein:
  the analysis perspective is a first analysis perspective; and
  the operations further comprise:
    determining a second analysis perspective is exhibited by at least one of the one or more source code program portions based at least in part on processing the source code program and the analysis perspective definition collection;
    storing a mapping of the second analysis perspective to the event data; and
    processing the mapping and the event data to display an indication of source code portions exhibiting the second analysis perspective, based at least in part on user input designating the second analysis perspective.

* * * * *